United States Patent [19]

Crew

[11] 3,893,759

[45] July 8, 1975

[54] OFF-AXIS VIEWING APPARATUS

[75] Inventor: Wynn D. Crew, Lakewood, Colo.

[73] Assignee: Microtech Press Inc., Lakewood, Colo.

[22] Filed: Nov. 14, 1973

[21] Appl. No.: 415,704

[52] U.S. Cl. .................. 353/79; 353/72; 353/99
[51] Int. Cl. ........................................ G03b 21/24
[58] Field of Search ............ 353/38, 98, 99, 78, 79, 353/77, 72, 119

[56] References Cited
UNITED STATES PATENTS

| | | | |
|---|---|---|---|
| 1,624,816 | 4/1927 | Triana et al. | 353/78 |
| 2,174,778 | 10/1939 | Croft | 353/78 |
| 2,562,297 | 7/1951 | Cordonnier | 353/99 |
| 3,692,399 | 9/1972 | Stewart | 353/99 |

FOREIGN PATENTS OR APPLICATIONS

| | | | |
|---|---|---|---|
| 929,740 | 7/1947 | France | 353/79 |

Primary Examiner—Harry N. Haroian
Attorney, Agent, or Firm—C. B. Messenger

[57] ABSTRACT

Projector-viewing apparatus providing enlarged images that are derived from microfiche and film strip storage elements and that are projected on a high gain directionally reflective projection screen with the images being viewed in a plano mirror mounted or held in off-axis position with respect to lines of projection from the projector and away from positions of concentrated reflected light passing outwardly from said high gain screen. Various angular and/or rotating supports are provided for the projector apparatus to attain the desired positionings and to provide increased utility and reduced costs.

12 Claims, 4 Drawing Figures

OFF-AXIS VIEWING APPARATUS

CROSS-REFERENCE TO RELATED APPLICATION

The viewer developments of the prsent invention can be beneficially used with the microimage storage and retrieval apparatus and projector shown and described in an earlier application by the same inventor (Ser. No. 214,096). The projector of such earlier disclosure is of small and handy size even though it incorporates lighting, cooling and optical features whereby 100 or 400 image pages may be presented on the film strip of an aperture card. Such a projector providing either 24X or 75X magnification can be used to display a magnified image for economic viewing in keeping with the present development.

BACKGROUND OF THE INVENTION

Considerable activity is presently directed to improvements in the field of information storage, retrieval and display. Early microfilm developments have shown the advisability of reducing drawings and printed materials to a smaller size for storage. Early developments for the display of microfilm materials have been refined and changed for use with subsequent microfiche developments. There have likewise been many information retrieval developments used in connection with microfilm and microfiche storage systems. The mentioned earlier application provides improvements in information retrieval operations, since aperture cards, which can be machine sorted, are provided as a mounting for the film strips. Further improvements embodied in the earlier application include the use of optical systems and film printing operations whereby the storage size of image pages is considerably reduced when compared with contemporary microfiche operations. Use of the previously described apparatus has indicated that additional benefits and advantages are inherent in the system if improved display or viewer capabilities are incorporated. With simplified viewer apparatus, a single film strip having 100 or more pages and a projector mechanism of small size and weight to magnify and present the image pages for separate viewing, a basic system is provided that is inherently comparable to the convenience and portability of books and pamphlets.

SUMMARY OF THE INVENTION

The present disclosure provides an improved viewer system and apparatus that is adapted for convenient use with the projector and image selector components of the mentioned previous disclosure. An overall beneficial result is attained when light from the projector is directed to a high gain directionally reflective screen positioned away from the projector so that an image enlarged from the film strip positioned in the projector is presented on the screen. The image is viewed in a plain mirror mounted or held in an off-axis position with respect to the center line of projection for the projector and away from positions of concentrated reflected light passing outwardly from the high gain screen. In order to facilitate attainment of the desired disposition of image and light paths, a tilted base is provided for the projector. Pivoting movements of the projector with respect to said base or together with the base provide multiple viewing positions from which a glare free image can be observed.

DESCRIPTION OF THE PREFERRED EMBODIMENTS

In order to enhance the potential benefits of the information storage and retrieval system embodied in the mentioned previous disclosure, it is desirable that the magnified image be viewable under circumstances other than the fixed installation desk top viewer assembly shown in FIG. 15 of such previous disclosure or even through use of the viewer installation shown in FIGS. 13 and 14 thereof. One option utilizing the relatively high illumination provided by the projector is to project a magnified image onto a wall screen for direct viewing. The wall screen, however, presents its own problems where portability or convenience of usage is desirable.

The present availability of "high gain" screen materials makes it possible to provide viewer systems having improved portability and convenience characteristics. Early use and investigation of such high gain screens in conjunction with the present projector were not entirely satisfactory from the standpoint of cost and user acceptance, however, since other accessories were required that were themselves of considerable cost. Later studies of such high gain screens when used with a projector having a strong light source now indicate that useful, beneficial, economical and adaptable viewing systems can be provided. Characteristics and features of such viewer systems are presented in the accompanying drawings.

Figure 2:
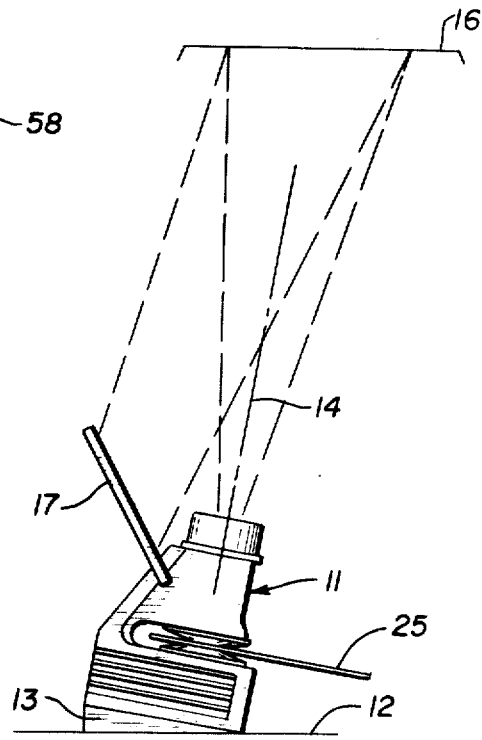
FIG. 2 is a cross-sectional elevation showing use of the invention.
Figure 3:
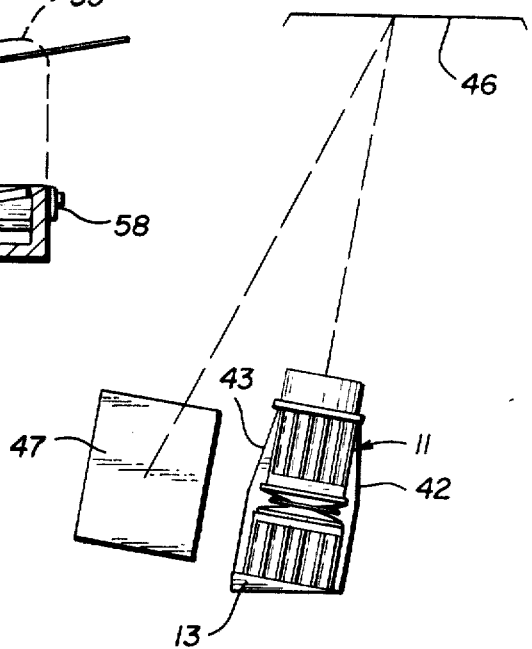
FIG. 3 is a front elevation showing a further adaptation of said invention.

FIGS. 2 and 3 are illustrative of a basic feature embodied in the present beneficial combination. In FIG. 2 a projector 11 similar to that shown and described in the previous application is shown disposed on a desk type support 12. A wedge block 13 is disposed beneath the projector so that the axis 14 of the projector is tilted and the magnified image that is directed to a remote screen 16 intercepts such screen at an angle. If the table support 12 and screen 16 are parallel, the projection angle and, accordingly, the angle of incidence for the central light path will be determined by the angularity for the angle block 13. The enlarged image that is projected onto the screen 16 can be seen by a user of the projector in the mirror 17 which is desirably mounted for adjustable positioning on the projector 11. The use of an angle support block provides a substantial improvement in the simplified viewer system depicted, since the image is presented in enlarged detail that can be clearly seen by the viewer without hot spots or glare to disrupt or disturb the viewer's observation.

Best viewer results are obtained when "high gain" screens are used. Such screens having a surface coated with glass beads bonded to a support medium with approximately one-half of the glass sphere exposed have a high luminance factor. Desirable screens are commercially available from the 3M Company and are sold as "High Gain" screens No. 7610 by such company.

The high luminance values for these screens are quite directional. Light that is directed to the screen is received by the glass beads, and such glass beads acting as separate spherical mirrors redirect the impinged light along a return pathway that substantially parallels the line of incidence for the light.

Studies related to the directional lighting characteristics for such screens have been made by the 3M Company, the luminance factors have been determined for various angles of light incidence and divergence. The luminance factor is expressed as a multiple of the brightness that would be observed when the same light is directed at a perfect diffusing white surface. The luminance factor for light impinged on a "high gain" screen at an incidence angle of 0° and observed at a divergence angle of 0° is 1610. In other words, the return light will be 1610 times more brilliant than the light returned from a white screen. The same impinged light observed at a ½° divergence angle has a luminance factor of 590. A 1° divergence angle has a luminance factor of 115, and a 1½° divergence angle has a luminance factor of 55. These increased luminance characteristics providing high reflectance are used with great benefit in other installations; for instance, as in the provision of reflective highway signs or in connection with front projection, photographic and television camera techniques. Other projection systems utilizing a low value illumination source can also benefit from the direct on-axis usage of these light reflective characteristics. A projector having the magnification characteristics required for use with the applicant's type of high reduction micropublishing activities cannot economically used such high gain characteristics in the direct or usually proposed manner. If the projector is positioned flat on a supporting element that is itself parallel to the projection screen, the incident light will be directed back toward the projector lens, and a substantial hot spot or hot spots will be seen when the screen is observed through a conventional mirror disposed close to the projection lens. Since the proper viewing angle is rather narrowly defined, these glare points or hot spots cannot be avoided by changes in the angular positioning of the mirror or changes in the viewer's eye position. Such glare points are objectionable from a viewer's standpoint, and they accordingly should be avoided. On-axis viewing systems using half-silvered or beam-splitter mirrors and decreased illumination are possible, but the increased cost of a specialized mirror and an improved lens system to properly accommodate the lower illumination levels is too costly. The fixed positioning required for the beam-splitter is also detrimental where the viewing components are to be used in various and alternate situations that are more conducive to user comfort.

When the projector is disposed on an angle base, the image projected to a screen positioned above the projector can be viewed without glare in a conventional mirror that is disposed in a position adjacent the projector but out of line with the axis thereof. When the projector is of relatively small size, one edge of the mirror can conveniently be brought to a position of close proximity with the projector or with the lens mounting for the projector. Such close positioning of the mirror will prevent the creation of substantial distortions in the projected image being viewed. The same close positioning for the mirror, however, will give rise to the creation of glare points that will be observed as hot spots on the screen if the axis for the projector is normal to the screen and the mirror and viewpoint are disposed at convenient positions providing an image page of regular size.

Studies have shown that the creation and presence of hot spots and glare points is dependent of the reflectance characteristics for the high gain screen used. If any part of the reflecting surface of the mirror is positioned within a 1½° divergence angle for light reflected from the screen, a hot spot will be observed on the screen. If the base for the projector is parallel to the screen and if the axis of the projected image is, accordingly, normal to the screen, two hot spots will usually be observed in a conventional mirror being held or positioned close to the projector lens. The viewer disturbing hot spots are avoided when a wedge block or angular base is provided as a support for the projector.

A POSITION

Figure 4:
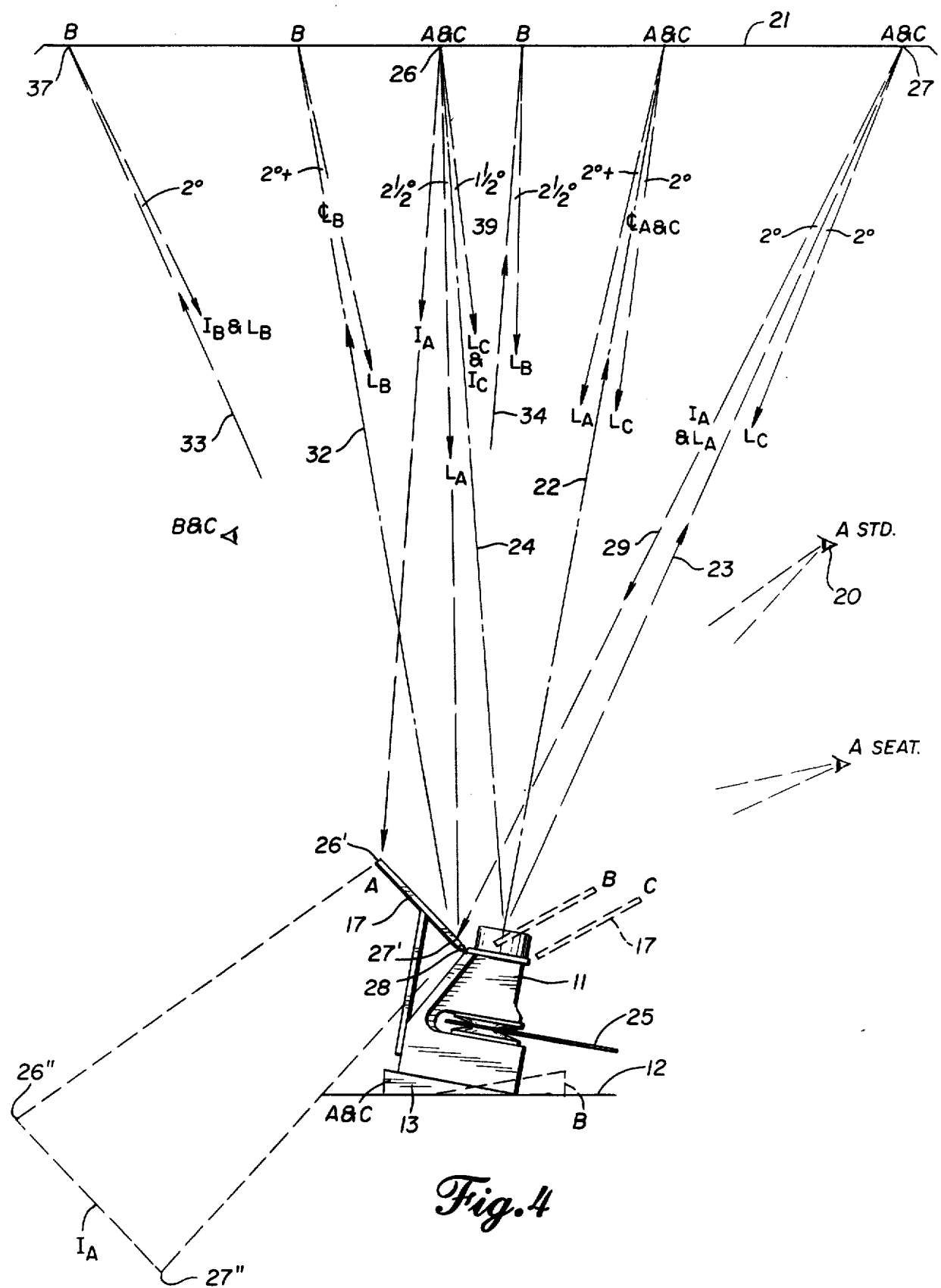
FIG. 4 is a diagramatic representation schematically illustrating benefits of the invention.

FIG. 4 presents representative light and image paths for installations in which a 10° wedge block is used to provide a tilted support for the projector 11. For such illustration the projector 11 is shown in full in a first position A. A 10° wedge block 13 is disposed beneath the projector 11 with the raised portion thereof at the back of the projector. The mirror 17 is disposed at an angle of approximately 45° with respect to a supporting platform or table 12. This particular mirror positioning would correspond to a viewer eye position as indicated at 20. The diagram layout overall corresponds to an installation where the projector 11 is on a table top at a height of approximately 32 inches above the floor and the image is projected to a screen 21 disposed at an 8-foot ceiling. For such arrangement the eye position 20 would correspond to that for a standing observer. For this first example the center line of the projected image is disposed along a line 22 which is further identified by the symbol $C_L$-A. The outer limits of the projected image correspond to the lines 23 and 24. Accordingly, the image page that is disposed on the film strip of aperture card 25 will be magnified and projected to the ceiling screen 21, and it will extend a fore and aft distance from the indicated A position at 26 to the A position at 27. The observer will view this total image page in the mirror 17 disposed at the A position. The information provided at the top of an image page and corresponding to the position 26 will be viewed in the mirror at the position 26'. The information at the bottom of the page will be viewed in the mirror 17 at a position 27' adjacent the bottom thereof and close to a pivot mount 28 for the mirror. The actual image to be viewed is indicated by the legend $I_4$ with the top of the page identified at 26" and the bottom as 27". The light emitted by the projector lens and carrying the magnified image of the bottom of the page courses along the line 23 to the screen position 27. The image projected on the screen is observed in the mirror 17, and the return path to the mirror for the image seen at this position is indicated by the line 29 or $I_3$. The light from the projector that provides the image on the screen at the bottom of the page position is itself directionally reflected due to the characteristics of the screen itself. The luminance factor for the reflected light that will come from this position at an angle of 1½° is 55. If this point 27 on the screen is observed in a conventional mirror at a position of view that is less than 1½° away from the line for incident light, a substantial glare will be noted. If the image at such point and the reflected light are aligned, the light will be senseable, and the image will be sharply seen. Accordingly, for this position the line of divergence for the reflected light and the view line for the image can coincide. This coincident line 29 is also identified by the letters $I_A$ and $L_A$ indicating that this is the image A and also reflected light related to the A position for the projector and mirror. As indicated, the actual angle of divergence from the incident light path along line 23 to the divergent line and image along line 29 is equal to 2°. The same analysis for projected light from the projector to the center of the image passing out along the line 22 and returning to the bottom of the mirror along the line $L_A$ provides a divergent angle of slightly greater than 2°. The projected light along the line 24 providing the top of the image page at 26 has a divergent angle directed back to the bottom of the mirror 17 of 2½° when returned along the light path $L_A$ to such position. The image projected to the position 26 on the screen returns along the image path $I_A$ to be seen at the top position 26' for the mirror 17.

With the described arrangement the divergent angles for the reflected light are all greater than 1½°, and such angle of divergence for the reflected light is gradually increased from the position 27 to the position 26 from 2° to 2½°. With this arrangement an even lighting gradiant is provided, and the observed image will be relatively evenly lighted and no substantial hot spots will be present. The reflected light will be greatest at the bottom position 27' of the mirror 17.

B POSITION

It is contemplated that substantial use of the present projector systems may be made in connection with the publication and retrieval of catalog type information. Parts and instruction manuals that are often the subject of up-date and revision operations can be beneficially disseminated and stored for convenient retrieval if all pages of the manual are presented on one or two aperture cards or on one microfiche. Actual use of catalog materials often involves more than one observer. At parts counters and information centers the required and most convenient viewing positions may not even be on the same side of a table or counter. Many information retrieval systems now being used require the establishment of a neutral observation point that may not be fully satisfactory to either observer, or some pivoting of an entire viewer mechanism is often required. The projector described in the earlier application and shown herein is of relatively small size, and, accordingly, the repositioning of the projector can be handily accomplished. Further, a simplified projecting system that required only the use of a projector, a ceiling screen and an observation mirror could be easily adaptable for viewer use in more than one position. These inherent useful benefits of a simplified viewing system are in part complicated, however, when the projector is not disposed in a flat position with the line of projection being normal with respect to the screen. If the projector 11 and its associated support block 13 are rotated on a flat table support 12, the projected image will itself be substantially moved on any ceiling mounted screen. A position B representative of such flat rotation is partially illustrated in FIG. 4. When the projector 11 and the mounting block 13 are conjointly rotated on the supporting table 12 about a pivot point on the support table 12 coincident with the projector axis, the mirror 17 will be moved to the indicated B position. The alternate position for the block 13 is also shown on such FIG. The center line for the projected image will then be disposed along the line 32. The bottom of the page will be projected along the line 33, and the top of the page will be projected along the line 34. Since the relative positionings for the projector and the mirror are the same, the divergent angles for reflected light from related portions of the projected image will be the same as that established for the A position. The angles for divergent light to be observed at the bottom of the mirror will again vary from 2° to 2½°. The projected image will be relatively evenly lighted, and no oppressive hot spots or glare will be observed.

From the foregoing analysis it will be apparent that the projector can be rotated in the described manner to provide alternate images that can be observed on opposite sides of a counter or table. One drawback related to such maneuver is the additional expense that would be necessary to provide a screen that would extend from the point 27 to the point 37. The described shortcoming is not substantial, since the high gain screen materials required are commercially obtainable at a cost of approximately $3.00 per square foot. Accordingly, the required additional screen for the described usage can be procured for approximately $10.00.

C POSITION

Beneficially, the optical and lighting advantages gained through use of an angle support for the projector can still be used in a system providing oppositely oriented view positions where only minimum sized projection screens are required. FIG. 4 additionally establishes relative positions for the support block and viewing mirror for a further position identified as position C. Position C is obtained when the projector 11 is rotated with respect to the support block 13 about the projector's optical axis. When the projector is rotated in this manner, the mirror 17 can be moved to the C position indicated. The angular positioning for the mirror can be adjusted by movements about the pivot 28 as the mirror support in sliding contact with the mirror is reciprocally extended or retracted. When adjusted, the center line for the projected image will again correspond with the line 22, but the bottom of the image page will now be directed along the line 24, while the top of the image page will be directed along the line 23. The light reflected by the high gain screen from the point 26 and the image from the point 26 will now course along the line 39 to the bottom position on the mirror 17. The angle of divergence for this reflected light and the C image is approximately 1½°. The image of the top of the page that is impinged at the screen point 27 will be observed at the top of the mirror, but the light radiated from such point can also be seen at the bottom of the mirror 17. The angle for this radiated light coursing back to the bottom of the mirror passes along the line $L_C$ which has a divergent angle of 2° with respect to the projected light 23. The divergence angles for reflected light observed from the bottom of the projected image to the top thereof in this C position, accordingly, changes on a regular gradiant from 1½° to 2°. The observed lighting for the projected image will again have a regulated gradiant of intensity, while the occurrence of a hot spot or glare point is narrowly avoided.

The positioning of the projected image for both the A and C positions are coincident, and, accordingly, a screen of the minimum size necessary for either position will be adequate for observations to be made from either the A or C viewing positions. The potential for establishing viewing capabilities from opposite sides while assuring attainment of a clear image that is free of glare represents a substantial improvement and cost benefit over previous viewing systems. Special lenses, beam splitters and expensive cabinetry are not required, and a minimum amount of screen may be used. Furthermore, the projector is of a small size that will not encumber a counter or table top. The screen itself is disposed in a position that is non-interfering with respect to other activities in a room enclosure. Due to the directional refraction characteristics for the screen, the projected image cannot be directly seen by others in the room, and the screen itself is not an interfering light source with respect to the activities of other persons in the room. The artificial or natural lighting of the room itself does not have to be dimmed or in any way reduced during periods for use of the projector. The projector component itself can be conveniently moved for other uses together with its angle base or apart therefrom.

ALTERNATE USES

Figure 1:
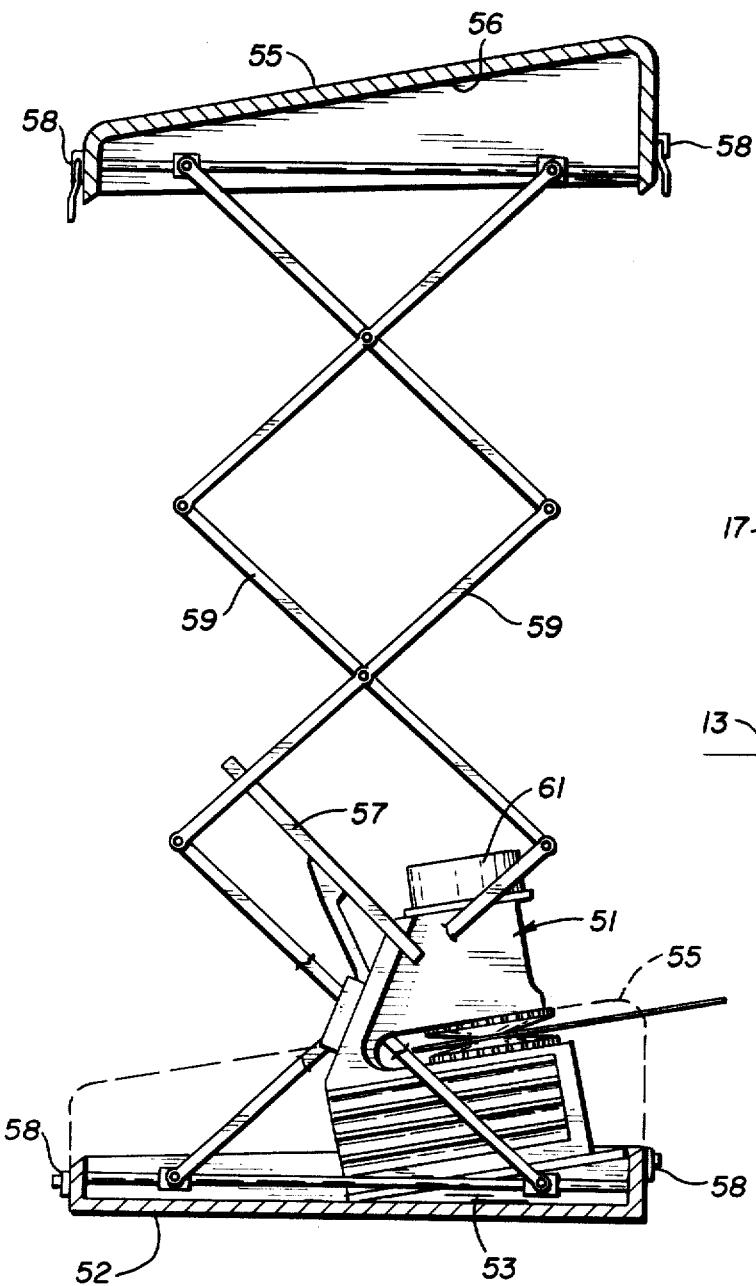
FIG. 1 is a side view in partial cross-section showing one embodiment of the invention.

Other uses are shown in FIGS. 1 and 3. FIG. 3 schematically depicts potential use of the projector with a hand-held mirror. The projector 11 is positioned on an angle base 13 so that one side 43 of the projector is elevated with respect to the opposite side 42. The line of projection is again disposed angularly with respect to a flat screen 46. The mirror 47 is not mounted on the projector, and it can, in fact, be hand-held at a position alongside the projector and at the same elevation with respect thereto or at alternate elevations above or below the projector. If the projector is supported at desk height or perhaps at the height of the arm for an armchair, the mirror can be held in the observer's lap in a manner fully simulating conventional book reading practices. Both the projector and the mirror can be handily placed, and, accordingly, page changes are easily made by moving any film strip in the projector. The projected image may be viewed when the mirror is disposed on any side of the projector itself, but the better lighting characteristics and best freedom from glare is obtained when the mirror is held adjacent to the higher side of the angle block so that the line of image projection is tilted away from the viewing mirror. Since the reflected light moves backwardly along the same tilted path, the mirror is only slightly out of the direct path of reflected light and substantial illumination of the projected image is gained, but the glare can still be avoided.

FIG. 1 illustrates a total viewer system that may be used where the retroreflector screen has not been previously installed. The viewer system of FIG. 1 is adapted for portable uses, and all necessary components that are to be used are carried and stored in a case structure. The case enclosure is inclusive of a base component 52 and a closure or lid 55. An angle block 53 is provided within the base 52 on which the projector 51 is disposed. Projector 51 and angle support 53 can be provided as a unitary assembly, or optionally the block 53 may be in fixed position in the base 52. The angle block 53 is disposed at an offset position in the base so that the image projected will be centered with respect to the interior screen surface 56 within the cover 55. A conventional plane mirror 57 is again mounted for adjustable positioning on the projector 51. The cover 55 and, accordingly, the screen 56 may be moved to alternate positions. In a first or carry position the cover is closed on the base 52, and the latches 58 may be interengaged to hold the total case closed. When the case is closed, the projector will be laid down within the case to be held in such position by positioning blocks (not shown). When the projector is to be used, the case will be opened, and the projector will be moved to the position shown. Scissors supports 59 interconnecting the base and cover will be extended, and the cover and its screen will be disposed in the elevated position illustrated. For this arrangement the projected image is focused on the screen 56 to be observed in the mirror 57. Due to the short light path, a lens extension may be used to obtain proper focusing.

For this installation where the projected image is displayed on a screen that is relatively close to the projector, the reflected light will predominantly be returned to the area of lens support 61. For this short light and image path arrangement, angular disposition of the screen with respect to the center line of projection is not ordinarily required to avoid glare and image hot spots. All portions of the viewing mirror are more than 2° from the path of predominant reflected light from the screen. Adequate lighting, image disposition and clarity can be obtained even though the distance from the projector lens support 61 to the screen 56 is less than 2 feet.

I claim:

1. Projector-viewer apparatus for display of information stored in microimage size on microfiche and film strip elements comprising a projector, a high gain retroreflector screen having directional refraction characteristics redirecting received light predominantly along lines of refraction substantially coincident with the line of incidence thereof to provide a luminance factor of at least forty at a divergence angle of one and one-half degrees, said projector and reflector screen being cooperatively positioned whereby the center line of projection for said projector is tilted with respect to the plane of said reflector screen, and a conventional plano mirror positioned adjacent said projector in off-axis position with respect to the center line of projection for said projector and away from said predominant lines of refraction of light from said high gain screen whereby images projected to and displayed on said screen are viewed in the mirror without glare.

2. The apparatus as set forth in claim 1 and further comprising a magnification lens system for said projector of at least 20X capability.

3. The apparatus as set forth in claim 1 wherein said screen is mounted on an overhead ceiling and the projector is positioned on a flat supporting surface parallel to said screen, and further comprising and angular support intermediate said supporting surface and projector for tilting the axis of the projector whereby the center line of projected light is accordingly at non-normal disposition with respect to said screen.

4. The apparatus as set forth in claim 3 wherein said angular support is a wedge block positioned beneath said projector.

5. The apparatus as set forth in claim 4 wherein said wedge block and projector are adapted for conjoint rotary movement on said flat supporting surface whereby the image position on said screen is moved.

6. The apparatus as set forth in claim 4 wherein said projector is adapted for rotating movement about the center line of projection for said projector and with respect to said wedge block whereby rotation of the projector about the axis of the projector provides inversion of said image on said screen without change of position thereof.

7. The apparatus as set forth in claim 1 wherein said mirror is mounted on the projector for movement therewith.

8. The apparatus as set forth in claim 7 wherein all portions of the reflective surface of said mirror are positioned away from the center line of projection for said projector an arc distance corresponding to a divergence angle of at least one and one-half degrees for all projector lighted image positions on said screen.

9. The apparatus as set forth in claim 7 wherein said mirror is pivotally mounted on said projector for movement to adjusted angular positions with respect to the projection axis for said projector.

10. The apparatus as set forth in claim 9 and further comprising an extensible support for said mirror for holding the mirror in its adjusted angular positions.

11. The apparatus as set forth in claim 1 and further comprising a carrying case closure to receive and support said screen, a support base for receiving and holding said projector, and extension means for interconnecting and moving said closure and screen into alternate carrying and viewing positions with respect to the support base.

12. The apparatus as set forth in claim 11 wherein said angle support operates to center the projected image on said screen.

* * * * *